Figure 1:
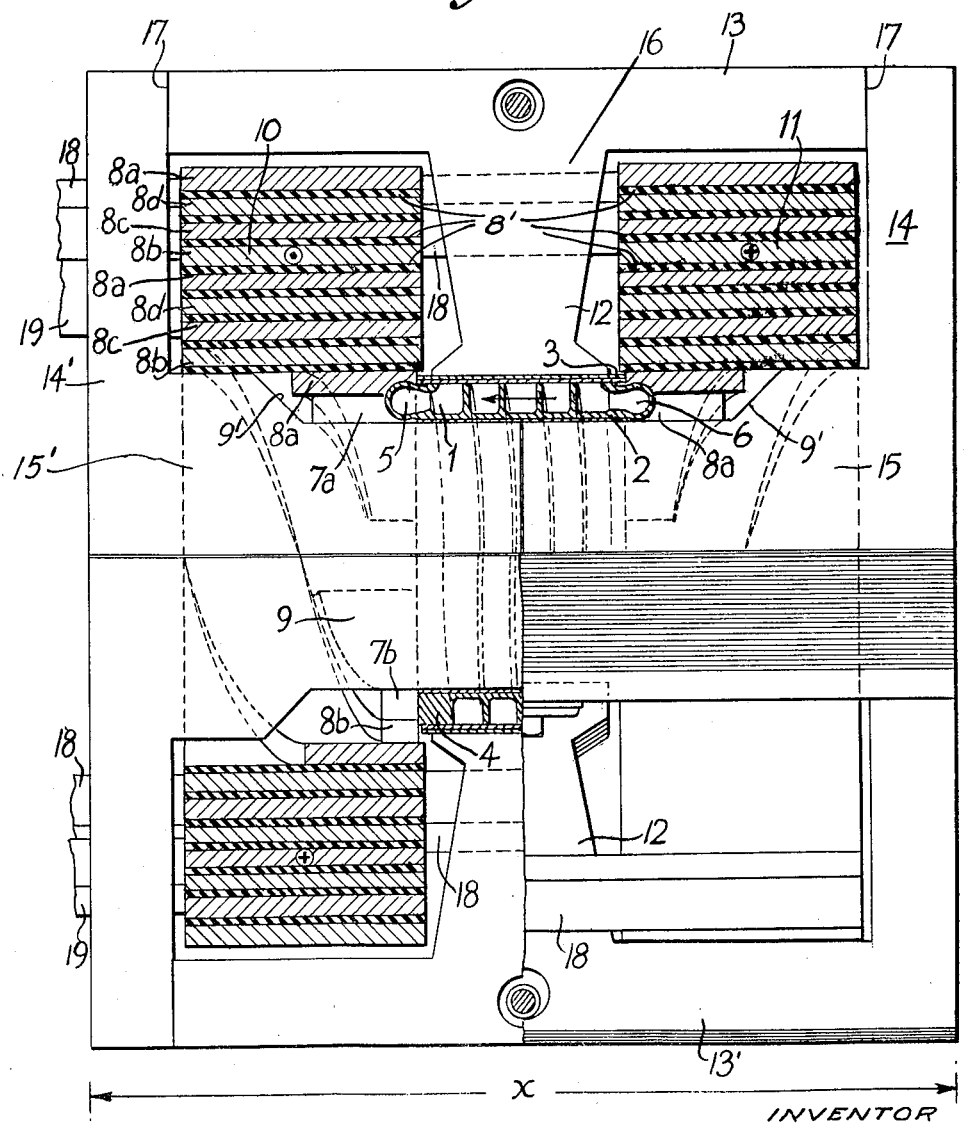

June 13, 1961     L. R. BLAKE     2,988,000
PUMPING APPARATUS

Filed Oct. 4, 1957     2 Sheets-Sheet 1

INVENTOR
LESLIE REGINALD BLAKE
ATTORNEY

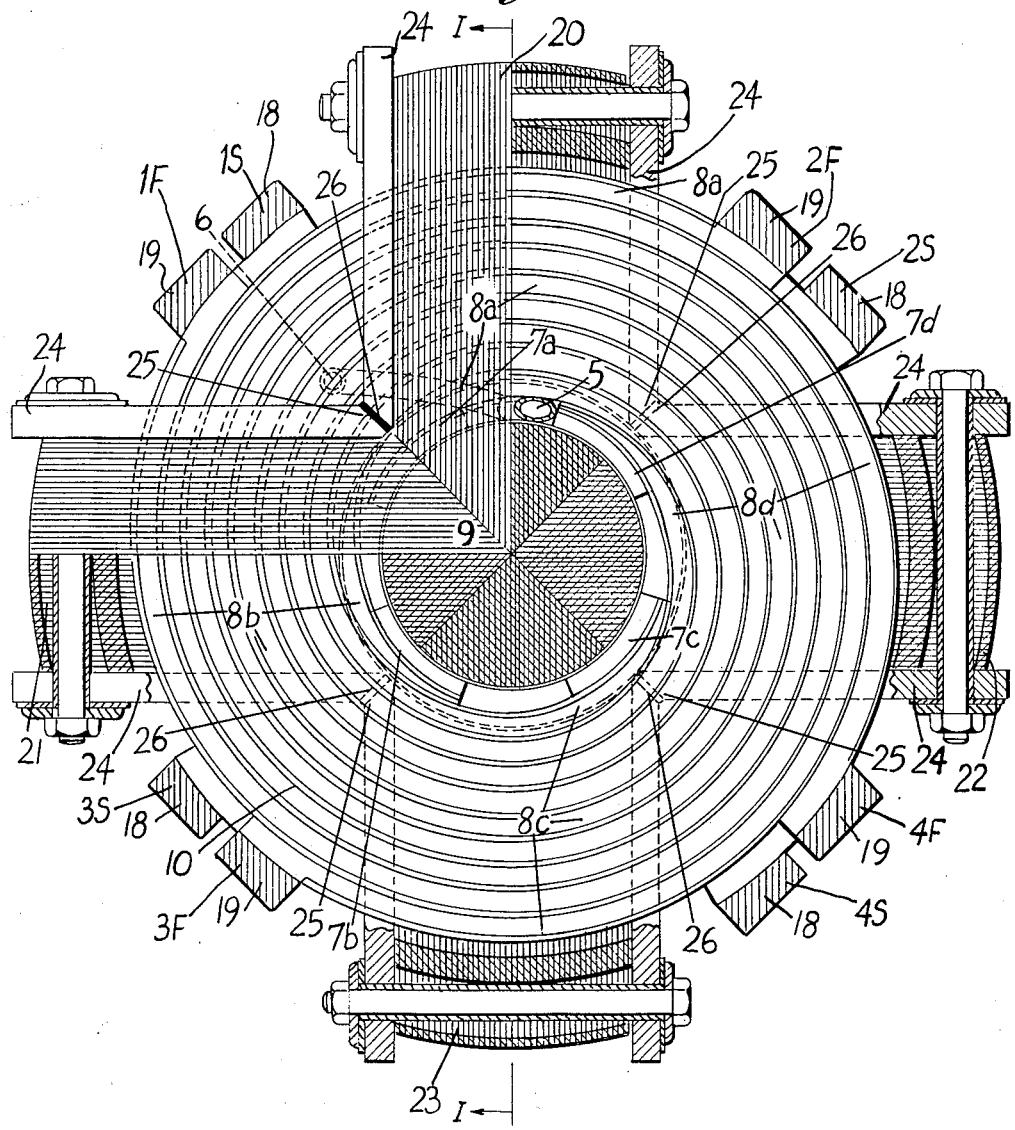

United States Patent Office 2,988,000
Patented June 13, 1961

2,988,000
PUMPING APPARATUS
Leslie Reginald Blake, Rugby, England, assignor to The British Thomson-Houston Company Limited, London, England, a British company
Filed Oct. 4, 1957, Ser. No. 688,188
Claims priority, application Great Britain Oct. 5, 1956
5 Claims. (Cl. 103—1)

This invention relates to so-called electromagnetic pumps in which an electrically conductive liquid, such, for example, as a liquid metal, is propelled along a duct by a force generated by the reaction between a transverse magnetic field and an electric current passed through the liquid transversely both of the duct and of said field, the action being somewhat analogous to that of an electric motor.

The well known, A.C. excited, flat linear induction pumps and annular linear induction pumps are more suited to the pumping of liquid metals having properties such as those of liquid sodium than to the pumping of liquid metals such as mercury or liquid bismuth having relatively high values of density, viscosity and resistivity. On the other hand the spiral (or, more strictly, helical) type of induction electromagnetic pump, also A.C. excited and functioning to urge the metal being pumped along a helical duct under the influence of a radial magnetic field rotating about the axis of the helix and reacting with current induced thereby in the liquid, tends to have a poor power factor and to be somewhat inefficient with liquids such as mercury. This inefficiency is especially disadvantageous where the amount of heat generated in the liquid due to electrical losses must be reduced to a minimum, as when the pump is likely to be frequently operated under standstill conditions with the full output pressure developed so that the heat generated cannot be carried away by the liquid. It is also a matter of some difficulty, where a spiral induction pump is to be used for pumping conductive liquid that is radioactive or at a high temperature, to obtain a reliable pump having a winding that will withstand these conditions. Moreover if the winding is heat insulated from the liquid, the pump becomes of even lower efficiency and power factor. Also, as the pipe duct may then not be supported externally by material of intrinsically high strength, it is difficult to make the pipe duct capable of withstanding high pressure, as it may have to do in certain applications. Conventional A.C. or D.C. conduction pumps, in which current through the liquid being pumped is applied externally rather than induced, could satisfy at least some of the requirements indicated, but with such pumps it is difficult to develop a high ratio of output pressure to rate of liquid flow without substantial sacrifice in respect of efficiency or size or both.

It is therefore an object of the present invention to provide a novel form of conduction pump which is especially suitable for operation with A.C. excitation and can readily be designed to give a relatively large ratio of output pressure to rate of flow with liquids such as mercury and bismuth and can also be designed to meet other requirements such as reliability, good efficiency and power factor and ability to withstand high pressure.

According to the invention there is provided an electromagnetic pump of the conduction type comprising in combination: a helical duct having conductive connection between its successive turns; a magnetic structure defining an annular pole coaxially surrounding said duct, a central core surrounded by the duct, and a yoke portion interconnecting the pole and core; and electrodes for the duct disposed at opposite ends thereof to permit application of current through the duct lengthwise of its axis and thus transversely of the successive turns of the duct; and a composite exciting winding surrounding said core axially outwardly of at least one end of the duct and comprising a plurality of coil-formed (that is, spiral or helical) conductors each connected to an electrode at said end of the duct, said conductors being mutually isolated electrically except at the duct. This pump may be termed a spiral conduction pump by analogy with the aforementioned spiral induction pump, although in fact the duct is again helical rather than spiral in form.

In carrying out the invention similar composite windings surrounding the core are preferably provided outwardly of both ends of the duct with their coil-formed conductors connected to the end electrodes provided for the duct at the opposite ends thereof, the sense of these windings being such that each aids the other in the production of flux across the duct between the pole and the core. The conductors constituting the or each winding are preferably spiral in form, being then coiled one within another, and may with advantage be respectively connected to individual electrodes spaced round the duct axis and connected to the end turn of the duct at the relevant end.

In operation, current applied at the free ends of the coil-formed conductors of the or each composite winding flows through the winding or windings and also along the duct between the electrodes at its opposite ends. In other words the pump is self-excited. Assuming that alternating current is employed, the fact that the component conductors of the or each winding are mutually isolated electrically except at the duct, the conductors to this end being fed from effectively separate sources of current such as separate secondary windings on a supply transformer, results in eddy current losses in the conductors being reduced to a minimum.

For A.C. operation the magnetic structure would of course be laminated or otherwise suitably constituted in accordance with usual practice in order to minimize eddy current losses therein. To this end the magnetic structure may be made up of angularly disposed packs of laminations in which the laminations lie generally parallel to the duct axis, each pack defining a segmental part of the core and annular pole and also a corresponding part of the yoke. Each pack may then be itself made up of two or more sections including one which defines the relevant part of the annular pole and is so formed in relation to the other section or sections that when being assembled therewith it is free for some radial movement with respect thereto whereby the pole-defining sections of the several lamination packs can clamp firmly round the outside of the helical duct, thereby to support it against internal pressure and thus enhance the suitability of the pump for use at high pressures.

In order that the invention may be more fully understood reference will now be made to the accompanying drawings which illustrate a pump embodying the invention and in which, in particular, FIG. 1 is a side elevation of the pump taken in axial cross-section except for the lower right-hand quarter of the figure which is in full side elevation, and FIG. 2 is an end elevation of the pump taken in transverse cross-section except for the upper left-hand quadrant which is in full end elevation.

Considering the general construction of the illustrated pump before referring in detail to the drawings, the pump comprises a helical duct defined in effect between the inner and outer walls of a double-wall hollow cylinder. An inlet pipe is joined to the duct at one end of this cylinder, and an outlet pipe at the other end. Also at each end of this cylinder are a number of segmental electrodes, preferably of a high conductivity material such as copper, which are cast, welded, brazed or otherwise secured to the end walls of the duct. To each of the electrodes is attached one end of a strip conductor, as of copper, which is wound into a spiral to form a composite magnetizing winding in conjunction with the other, similarly formed, strip conductors at the same end, all the strips at the same end being interleaved with each other and being mutually isolated electrically with intervening insulation except where they are connected by way of the electrodes and the end walls of the duct. The windings thus formed at each end are wound in a similar hand so that current flowing from the radially outer ends of the strips in one winding towards the electrodes, at their radially inner ends and passing from there along the duct, will flow outwardly from the radially inner ends of the strips of the other winding to their outer ends. Embracing the two composite magnetizing windings is a laminated magnetic structure defining a core within the duct cylinder and an annular pole round the outside of this cylinder. The strips of one winding are respectively connected to corresponding ends of separate secondary windings on a supply transformer, while the strips of the other winding are respectively connected to the remaining ends of the secondary windings; that is, the strips of one winding are connected to the "starts" of the respective transformer secondary windings and the strips of the other winding to the "finishes" of these windings. As a result, when the transformer is energized current will flow through the exciting windings to establish a field across the duct between the pole and the core, and this field will react with the same current where it flows in the duct, to drive the liquid along and around the helix.

Turning now to the figures in detail, the helical pump duct 1 is shown constructed in two parts, namely an inner part 2 which is machined with helical grooves to define three sides of successive turns of the duct and an outer part 3 which is fitted over the inner part 2 and welded to it to complete the helical duct 1, the latter being therefore effectively defined between inner and outer walls of a double-walled cylinder 2—3. A conductive connection is afforded between the successive turns of the duct through the duct walls, as defined between the grooves machined in the part 2. The end walls 4 are thickened for strength and at suitable points round the periphery an inlet tube 5 is welded at one end and an outlet tube 6 at the other. Also spaced around each end of the duct are four segmental electrodes 7a–d, as of copper, which are cast integral with or welded to the end walls 4. These electrodes 7 are machined so that respective copper strip conductors 8a–d can readily be attached to them as by brazing. The four conductors 8a–d attached to the electrodes at each end are wound spirally together to form a composite magnetizing winding 10 at one end and 11 at the other end, each conductor being electrically isolated from its neighbour, except where it is connected through its electrode 7 to the end wall 4, to avoid making a shorted turn. This electrical isolation of the conductors 8 is ensured by intervening insulation 8′ and by connecting them, as will be further described later, to separate secondary windings of a supply transformer (not shown) providing excitation for the magnetizing windings. The electrical insulation can be mica or any other high temperature insulation of low or high grade. The spiral windings 10 and 11 are wound in respective senses, such that the current flow in them is in opposite directions; for example, the current in 10 is shown as being clockwise and in 11 anti-clockwise. The magnetic circuit of the pump includes a central magnetic laminated core 9 which the helical duct 1 surrounds, the cross-section of this core being increased, as indicated at 9′, at positions outwardly of the ends of the channel. The remainder of the magnetic circuit, also laminated, consists of an annular pole 12, surrounding the duct 1 and preferably shaped in the manner shown to keep leakage flux to a minimum, and yoke portions, such as 13 and 13′, together with further yoke portions, such as 14 and 14′. The magnetic structure is shown made up of four lamination packs 20–23 at right angles to each other, and each stack is made up of three parts, namely two parts, such as 15 and 15′, for the central core section 9 and the respective yoke portions, such as 14 and 14′, and a part 16 for the pole 12 and yoke portion, such as 13 and 13′. Butt joints 17 formed in transverse planes between the parts 15 and 16 permit the parts 16 to be firmly clamped about the duct cylinder 2—3 to support the latter against internal pressure. The lamination packs 20–23 are shown clamped together by clamps 24 which again may be of copper or may be of stainless steel if cooling requirements are less arduous.

The clamps 24 for each pack inter-fit with those of the adjacent packs, being to this end chamfered at 25 as indicated, and pieces of electrical insulation 26 are inserted between the clamps 24 to reduce any tendency to produce a shorted turn effect. The widths of the spirally wound strip conductors 8a–d are tapered at their inner ends to accommodate the change at 9′ in the section of the central core 9 and are also cut away in parts to allow for the pipes 5 and 6 to be led to and from the pump duct.

The outer end of each spiral strip 8a–d in the winding 11 at one end of the pump has joined to it a conductive bar 18 which extends axially to the other end of the pump where it is connected to the supply transformer (not shown). The outer end of each spiral conductor 8a–d of the winding 10 at this other end of the pump has likewise joined to it a conductive bar 19 connected at this same end to the transformer. The bars 18 are connected to corresponding ends of four separate secondary windings on the supply transformer, and the bars 19 are connected to the other ends of these windings. These connections are indicated in FIG. 2 by the notations 1S, 2S, 3S and 4S applied to the conductors 18 and 1F, 2F, 3F and 4F applied to the conductors 19, the letters S and F denoting connection to "starts" and "finishes" respectively of the transformer secondary windings and the appended numerals indicating to which particular one of the four windings the connection is taken. For maximum electrical efficiency, the supply transformer is preferably located close to the pump at the end to which the bars 18 extend. Preferably also, the primary and secondary windings of the transformer would be interleaved to minimize the leakage reactance of the transformer. The transformer primary can be supplied from an alternating voltage having an amplitude according to the number of turns on the primary and secondary windings and some suitable frequency which, for the pump shown, is preferably 15 c./s. in order to obtain the best power factor without making the transformer too large. Normal supply frequency, that is 60 c./s., may also be suitable however.

With a pump of the form described having the dimension $x$ of about 3.75 inches and the other dimensions to scale, standstill pressure in excess of 100 lb./sq. in. can be realized without overheating the winding and a flow of nearly 1 gal./min. can be achieved but at a somewhat lower pressure.

A pump, constructed as hereinbefore described and illustrated has a number of advantages. Since it is A.C. excited, a supply transformer can be located close to the pump to increase the voltage to a higher level so that the actual supply can be located distant from the pump with negligible bus bar losses. The transformer, being static equipment, should be highly reliable and need no maintenance, and so also should the pump since it is of robust construction and requires electrical insulation of only a very low level of the order for instance of one volt. The windings 10 and 11 are shown as having about 2¼ effective turns each but a higher or lower number of turns could be employed. With a smaller number of magnetizing turns the supply current would be larger and the voltage lower; also there would be greater armature reaction effects, which may make it necessary to have a compensating winding, and the ohmic loss in the liquid would be higher, but to compensate the power factor would also be higher. With a larger number of turns the current would be lower, the voltage higher, the power factor lower, armature reaction effects less and the ohmic loss in the liquid less. In the present instance 2¼ turns were chosen to keep the ohmic loss in the liquid sufficiently small to enable the pump to be operated at standstill.

A further advantage is that the pump duct 1 can be adequately supported internally by the central magnetic core 9 and externally by the pole 12. This enables the pump duct 1 to withstand a high pressure without necessitating the use of thick walls for it, a requirement which would cause a prohibitive reduction in performance due to most of the supply current passing into the walls and not passing within the liquid where it can interact with the magnetic field to produce the electromagnetic force which is the origin of the output pressure of the pump. Yet another advantage of the arrangement is that the pump is easy to cool for the clamps 24 for the lamination pack 20-23 can be made of copper and can be extended if necessary to provide a greater cooling surface. Furthermore, a copper lamination or a number of copper laminations could be interposed with the magnetic laminations to further improve cooling and the withdrawal of heat from the liquid in the pump duct. Furthermore, since the magnetizing arrangements are such that leakage flux is kept to the minimum, the iron sections and hence the copper conductor lengths are kept to a minimum and the power factor is kept high, while the input apparent power or volt-amperes are kept low, thus easing the requirements on the supply transformer and the supply equipment.

What I claim is:

1. In an electromagnetic pump of the conduction type comprising in combination a helical duct having conductive connection between its successive turns; a magnetic structure defining a central core surrounded by said duct, an annular pole coaxially surrounding said duct for providing a non-rotating radially extending magnetic field between said pole and core, a yoke portion interconnecting the pole and core; end electrodes for the duct disposed at opposite ends thereof to permit application of current through the duct lengthwise of the axis and thus transversely of the successive turns of the duct; and an exciting winding surrounding said core axially outwardly of at least one end of the duct, a composite winding constituting said exciting winding and comprising a plurality of coil-formed conductors passing around said core and connected to individual electrodes spaced around the duct axis and connected to the end turn of the duct at said one end of the duct, said conductors being mutually isolated electrically from each other except at the duct.

2. An electromagnetic pump as claimed in claim 1 having similar composite widings surrounding the core axially outwardly of both ends of the duct with their coil formed conductors connected to the end electrodes provided for the duct at said ends, the windings having appropriate senses to aid each other in the production of flux.

3. An electromagnetic pump as claimed in claim 1 wherein the conductors constituting said composite winding are spiral in form and are coiled one within another.

4. An electromagnetic pump as claimed in claim 1 wherein the magnetic structure is made up of angularly disposed packs of magnetic laminations with the laminations lying generally parallel to the duct axis, each pack defining a segmental portion of the core and annular pole and also a corresponding portion of an interconnecting yoke portion.

5. An electromagnetic pump as claimed in claim 4 wherein each said pack of laminations is made up of two or more parts including one which defines a segmental portion of the annular pole and is so formed in relation to the other part(s) that when being assembled therewith it is free for some radial movement relatively thereto whereby those parts of the several packs which define portions of the annular pole can clamp firmly round the outside of the helical duct to support it against internal pressure.

References Cited in the file of this patent

UNITED STATES PATENTS

| 1,298,664 | Chubb | Apr. 1, 1919 |
| 2,702,004 | Blake et al. | Feb. 15, 1955 |
| 2,715,686 | Asti | Aug. 6, 1955 |
| 2,716,943 | Vandenberg | Sept. 6, 1955 |
| 2,770,196 | Watt | Nov. 13, 1956 |

FOREIGN PATENTS

| 239,816 | Switzerland | Mar. 1, 1946 |
| 528,091 | Great Britain | Oct. 22, 1940 |
| 718,429 | Great Britain | Nov. 17, 1954 |